United States Patent
Ham et al.

(10) Patent No.: US 10,289,399 B2
(45) Date of Patent: May 14, 2019

(54) SYSTEM FIRMWARE CONFIGURATION DATA

(71) Applicant: Hewlett-Packard Development Company, L.P., Houston, TX (US)

(72) Inventors: Christopher H Ham, Spring, TX (US); Scott B Marcak, Cypress, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/110,915

(22) PCT Filed: Jan. 22, 2014

(86) PCT No.: PCT/US2014/012455
§ 371 (c)(1),
(2) Date: Jul. 11, 2016

(87) PCT Pub. No.: WO2015/112128
PCT Pub. Date: Jul. 30, 2015

(65) Prior Publication Data
US 2016/0335071 A1    Nov. 17, 2016

(51) Int. Cl.
*G06F 8/65* (2018.01)
*G06F 9/24* (2006.01)
(Continued)

(52) U.S. Cl.
CPC ............... *G06F 8/65* (2013.01); *G06F 9/24* (2013.01); *G06F 9/44* (2013.01); *G06F 11/1417* (2013.01);
(Continued)

(58) Field of Classification Search
CPC ..... G06F 8/65; G06F 9/24; G06F 9/44; G06F 11/1417; G06F 11/2273; G06F 11/2284; G06F 2011/2278
See application file for complete search history.

(56) References Cited

U.S. PATENT DOCUMENTS 5,822,581 A * 10/1998 Christeson ............... G06F 9/24
                                                                      713/1
6,185,696 B1    2/2001 Noll
(Continued)

FOREIGN PATENT DOCUMENTS

CN          1811707 A        8/2006
JP       2010170325 A   *    8/2010
WO   WO 2013147915 A1  *   10/2013   .......... G06F 11/1433

OTHER PUBLICATIONS

Wikipedia, "Booting," 2013, pp. 1-16, downloaded from the the Wayback Machine Internet Archive at <url>:https://web.archive.org/web/20130117114025/https://en.wikipedia.org/wiki/Booting.*
(Continued)

*Primary Examiner* — Thuy Dao
*Assistant Examiner* — Stephen D Berman
(74) *Attorney, Agent, or Firm* — HP Inc. Patent Department (57) ABSTRACT

In one example of the present disclosure, a computing system is provided. The computing system is to initiate a power on self-test (POST) process, determine that a change has been made to system firmware configuration data, start a timer, and determine that the timer has expired. Thereafter, the computing system is to power-off and power-on the computing system, replace current system firmware configuration data with backup system firmware configuration data, and/or generate a notification indicating system firmware configuration data has been reverted.

19 Claims, 5 Drawing Sheets

(51) Int. Cl.
*G06F 9/44* (2018.01)
*G06F 11/14* (2006.01)
*G06F 11/22* (2006.01)

(52) U.S. Cl.
CPC ...... *G06F 11/2273* (2013.01); *G06F 11/2284* (2013.01); *G06F 2011/2278* (2013.01)

(56) References Cited

U.S. PATENT DOCUMENTS

| | | | |
|---|---|---|---|
| 6,324,644 B1 | 11/2001 | Rakavy et al. | |
| 6,629,259 B2 | 9/2003 | Lee | |
| 6,647,512 B1* | 11/2003 | James | G06F 11/1417 713/2 |
| 6,715,106 B1 | 3/2004 | Mermelstein | |
| 6,757,838 B1* | 6/2004 | Chaiken | G06F 9/4403 714/15 |
| 7,143,275 B2 | 11/2006 | Cepulis et al. | |
| 7,322,029 B2 | 1/2008 | Diaz | |
| 8,078,856 B1* | 12/2011 | Righi | G06F 11/2284 713/1 |
| 8,140,475 B1 | 3/2012 | Sparks | |
| 8,438,423 B1 | 5/2013 | Barkelew | |
| 2004/0255106 A1 | 12/2004 | Rothman et al. | |
| 2005/0039081 A1* | 2/2005 | Chang | G06F 11/1417 714/36 |
| 2006/0259756 A1* | 11/2006 | Thompson | G06F 8/65 713/2 |
| 2008/0168434 A1* | 7/2008 | Gee | G06F 8/65 717/173 |
| 2008/0229158 A1* | 9/2008 | Saito | G06F 11/1417 714/55 |
| 2008/0270685 A1 | 10/2008 | Yuuichiro | |
| 2009/0150662 A1* | 6/2009 | Desselle | G06F 8/65 713/100 |
| 2009/0222804 A1 | 9/2009 | Lyle et al. | |
| 2010/0030991 A1* | 2/2010 | Liu | G06F 8/65 711/163 |
| 2011/0087870 A1* | 4/2011 | Spangler | G06F 21/554 713/2 |
| 2011/0179406 A1 | 7/2011 | Nobuyuki | |
| 2012/0079260 A1* | 3/2012 | Yin | G06F 11/1417 713/2 |
| 2012/0089870 A1* | 4/2012 | Chen | G06F 11/1417 714/30 |
| 2013/0205063 A1 | 8/2013 | Zhang et al. | |
| 2013/0339938 A1* | 12/2013 | He | G06F 8/65 717/168 |
| 2015/0095632 A1* | 4/2015 | Huang | G06F 11/1417 713/2 |
| 2015/0149815 A1* | 5/2015 | Maity | G06F 11/1435 714/5.11 |

OTHER PUBLICATIONS

Jerry Jex, "Flash memory BIOS for PC and notebook computers," 1991 [retrieved on Dec. 20, 2018], IEEE Pacific Rim Conference on Communications, Computers and Signal Processing Conference Proceedings, pp. 692-695, downloaded from the Internet at <url>: https://ieeexplore.ieee.org. (Year: 1991).*

Willian Arbaugh et al., "A secure and reliable bootstrap architecture," 2002 [retrieved on Dec. 20, 2018], IEEE Symposium on Security and Privacy, pp. 65-71, downloaded from the Internet at <url>:https://ieeexplore.ieee.org. (Year: 2002).*

David Cooper et al., "BIOS Protection Guideline," 2011 [retrieved on Dec. 20, 2018], Recommendations of the National Institute of Standards and Technology, pp. 1-26, downloaded from the Internet at <url>:http://www.gocs.info/pages/fachberichte/archiv/077-NIST-SP800-147-April2011.pdf. (Year: 2011).*

Restoring the BIOS, 2013, pp. 1-4, Hewlett-Packard Development Company, L.P., Available at: <h10025.www1.hp.com.

* cited by examiner

*Fig. 3*

SYSTEM FIRMWARE CONFIGURATION DATA

BACKGROUND

Power-on self-test (POST) is a process performed by a computing system (e.g., a laptop or desktop) after the system is powered on. The POST process may be handled by the system's basic input/output system (BIOS) or unified extensible firmware interface (UEFI), and may include routines to execute internal diagnostic tests to determine if the systems components are properly working. Once the POST process has completed successfully, operating control of the system is transferred to a boot source (e.g., a boot loader) to load the main operating system (OS) or runtime environment.

BRIEF DESCRIPTION OF THE DRAWINGS

Examples are described in the following detailed description and in reference to the drawings, in which.

NOTATION AND NOMENCLATURE

Certain terms are used throughout the following description and claims to refer to particular system components. As one skilled in the art will appreciate, computer companies may refer to components by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct electrical or mechanical connection, through an indirect electrical or mechanical connection via other devices and connections, through an optical electrical connection, or through a wireless electrical connection.

Additionally, the term "system firmware configuration data" is intended to refer to the current/previous settings of the system firmware. For example, when the system firmware comprises a BIOS or UEFI, the system firmware configuration data refers to the current/previous settings of the BIOS/UEFI. Such BIOS/UEFI settings may be user configurable, and may comprise, for example, security configuration settings, hardware configuration settings, and/or system configuration settings. More precisely, such BIOS/UEFI settings may comprise, for example, the controller emulation mode setting, the cover lock control setting, the cover sensor policy management setting, the device control settings (e.g., TPM, system audio controller, network controller, SATA ports, etc.), the USB port control settings, the PCI/PCI-e slot control settings, the data execution prevention control setting, the VTx control setting, the VTd control setting, the TPM management policy settings, the legacy/UEFI control setting, the secure boot control setting, the secure boot key management settings, the fast boot control setting, the CPU power management policy setting, the SATA power management setting, the PCI-e power management setting, the ACPI S5 maximum power savings mode setting, the POST UI display policy setting, the PMM memory allocation policy setting, the default onboard device resource assignment settings, the CPU turbo mode setting, the primary video designation setting, the USB EHCI port debug control setting, the USB 3.0 BIOS driver control setting, the multi-processor control setting, the hyper-threading control setting, the Intel AMT control settings, the option ROM launch policy settings, and/or the network-based BIOS update control and policy settings.

In view of the above, it should be understood that "system firmware configuration data" refers to the current/previous settings of the system firmware (e.g., BIOS/UEFI) as opposed to the system firmware code. These settings may be configurable by the user via a configuration utility to alter, e.g., security configuration, hardware configuration, and/or system configuration.

In addition to the above, the term "operational control" is intended to refer to the entity (e.g., BIOS, UEFI, and/or boot loader) that is currently controlling operation of the computing system.

Furthermore, the term "boot source" is intended to refer to a program that loads another program. The boot source may be, for example, a boot loader that loads a main operating system or a runtime environment.

DETAILED DESCRIPTION

The following discussion is directed to various examples of the present disclosure. Although one or more of these examples may be preferred, the examples disclosed should not be interpreted, or otherwise used, as limiting the scope of the disclosure, including the claims. In addition, one skilled in the art will understand that the following description has broad application, and the discussion of any example is meant only to be descriptive of that example, and not intended to intimate that the scope of the disclosure, including the claims, is limited to that example.

As mentioned above, when a POST process is completed successfully, operational control of the computing system may be transferred to a boot source (e.g., to a boot loader to load the main operating system (OS)). Unfortunately, this does not always occur, and the POST process may "hang" for various reasons and prevent the system from transferring control to the boot source. One typical reason this occurs is because the user has changed system firmware configuration data (e.g., BIOS/UEFI settings), and those changes cause the system to fail to successfully complete the POST process. For example, the user may have modified the CPU turbo mode setting, SATA power management setting, or another aspect of the system firmware configuration data, and these changes may have prevented the system from successfully completing the POST process. Put another way, the changes the user made to the BIOS/UEFI settings caused the system to hang during the POST process. As a result, control was not transferred to the boot source, and this may have effectively eliminated the computer system's usefulness, and further may have tarnished the user's perception of the computer system's quality and reliability.

When faced with the above-mentioned POST issues, a user is typically left with various undesirable and cumbersome corrective options. For example, the user may try to manually undo the changes made to the system firmware configuration data, but this is time consuming and, in many cases, the POST hang occurs before the computer setup or configuration utility can launch, so the user is unable to access the interface to undo the offending changes. In other instances, the user may try to revert to default system firmware configuration data settings by, for example, pressing a special key combination when the power button is pressed, pressing a button on the motherboard, and/or shorting pins on the motherboard. These actions, however, generally require knowledge beyond that of an average user, and may require the user to open the chassis. Furthermore, these actions may not be guaranteed to work because some settings may not be reverted once changed even when default settings are triggered.

Aspects of the present disclosure attempt to address at feast the above-described problems by providing an automatic recovery method to address POST hang failures. More specifically, aspects of the present disclosure provide a novel and previously unforeseen solution which automatically recovers from POST hang failures without requiring the user to perform remedial actions or have explicit knowledge of the changes that caused the failure. As a result, the number of service events related to these types of issues may be reduced, and therefore reduce the number of support calls, technician deployments, and/or system returns, all of which save time and expense for computer system manufacturers and/or the companies that use the system. This and other aspects of the present disclosure are discussed below with reference to various figures and examples.

In one example in accordance with the present disclosure, a computing system is provided. The computing system comprises a processing device and a machine-readable medium encoded with instructions executable by the processing device. The machine-readable medium comprises (i) instructions to initiate a POST process, (ii) instructions to determine that a change has been made to system firmware configuration data, (iii) instructions to start a timer, (iv) instructions to determine the timer has expired, and (v) instructions to at least one of (a) power-off and power-on the computing system, (b) replace current system firmware configuration data with backup system firmware configuration data, and (c) generate a notification indicating system firmware configuration data has been reverted.

In another example in accordance with the present disclosure, a method for controlling a computing system is provided. The method comprises initiating a POST process and determining that a change has been made to system firmware configuration data by comparing current system firmware configuration data to backup system firmware configuration data. The method further comprises starting a timer, continuing the POST process, and stopping the timer prior to transferring operational control of the computing system to a boot source. Thereafter, the method comprises replacing the backup system firmware configuration data with the current system firmware configuration data, and transferring operational control of the computing system to the boot source.

In yet another example in accordance with the present disclosure, a non-transitory machine-readable medium is provided. The non-transitory machine-readable medium comprises instructions, which when executed, cause a computing system to determine that a change has been made to system firmware configuration data and start a timer. If the timer has not expired prior to transferring operational control of the computing system to a boot source, the instructions cause the computing system to stop the timer prior to transferring operational control of the computing system to the boot source, replace backup system firmware configuration data with current system firmware configuration data, and transfer operational control of the computing system to the boot source. On the other hand, if the timer has expired prior to transferring operational control of the computing system to the boot source, the instructions cause the computing system to conduct at least one of the following: power-off and power-on the computing system, replace the current system firmware configuration data with the backup system firmware configuration data, and generate a notification indicating system firmware configuration data has been reverted.

Figure 1A:
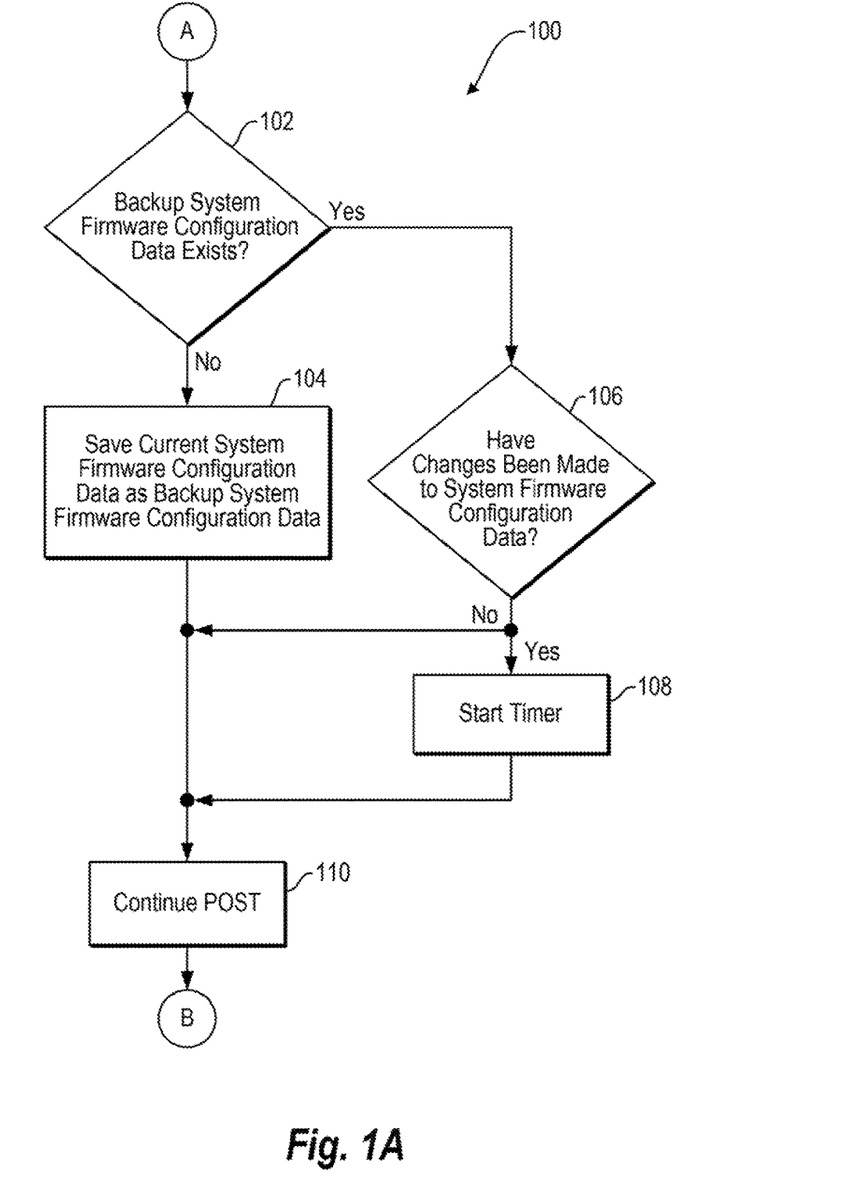
FIG. 1(a) depicts an example process flow diagram for automatically recovering from a POST hang failure in accordance with an aspect of the present disclosure.
Figure 1B:
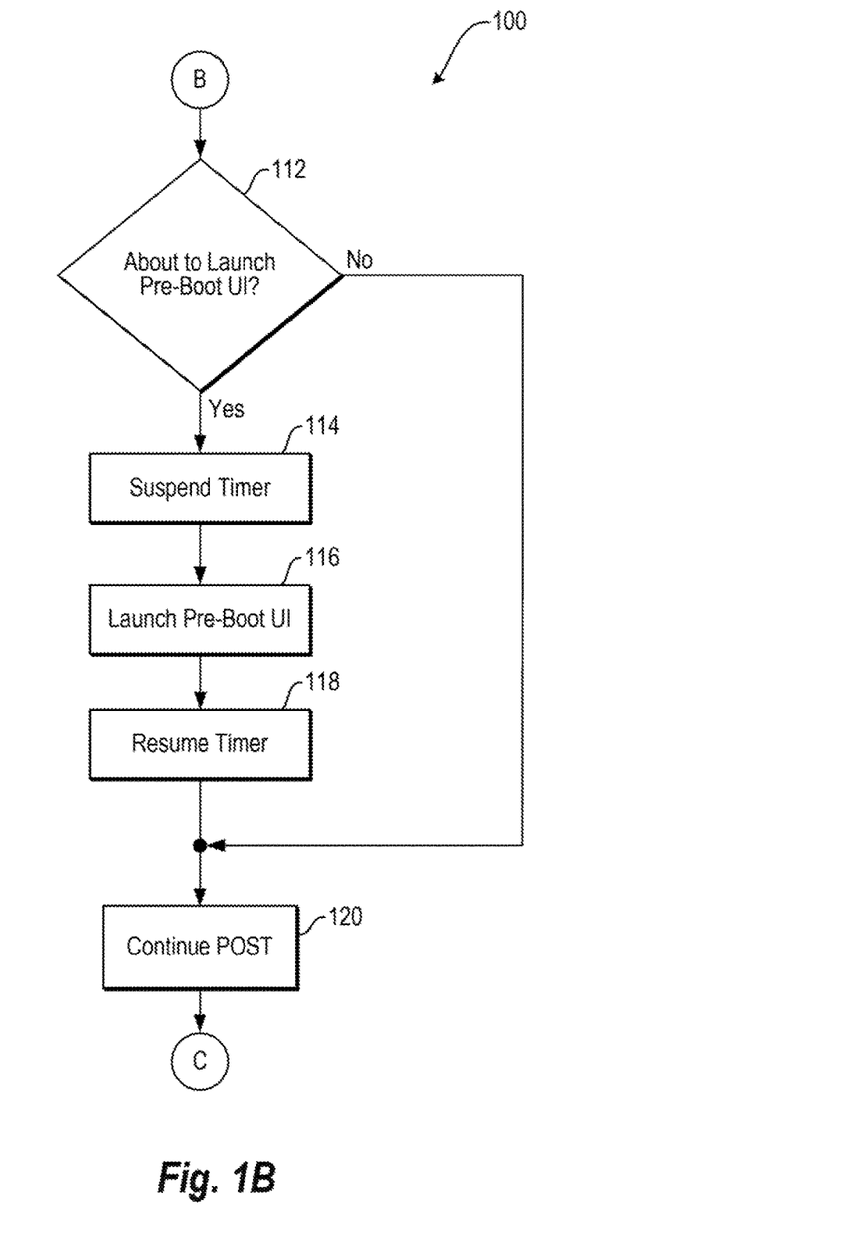
FIG. 1(b) depicts further aspects of the example process flow diagram for automatically recovering from the POST hang failure in accordance with an aspect of the present disclosure.
Figure 1C:
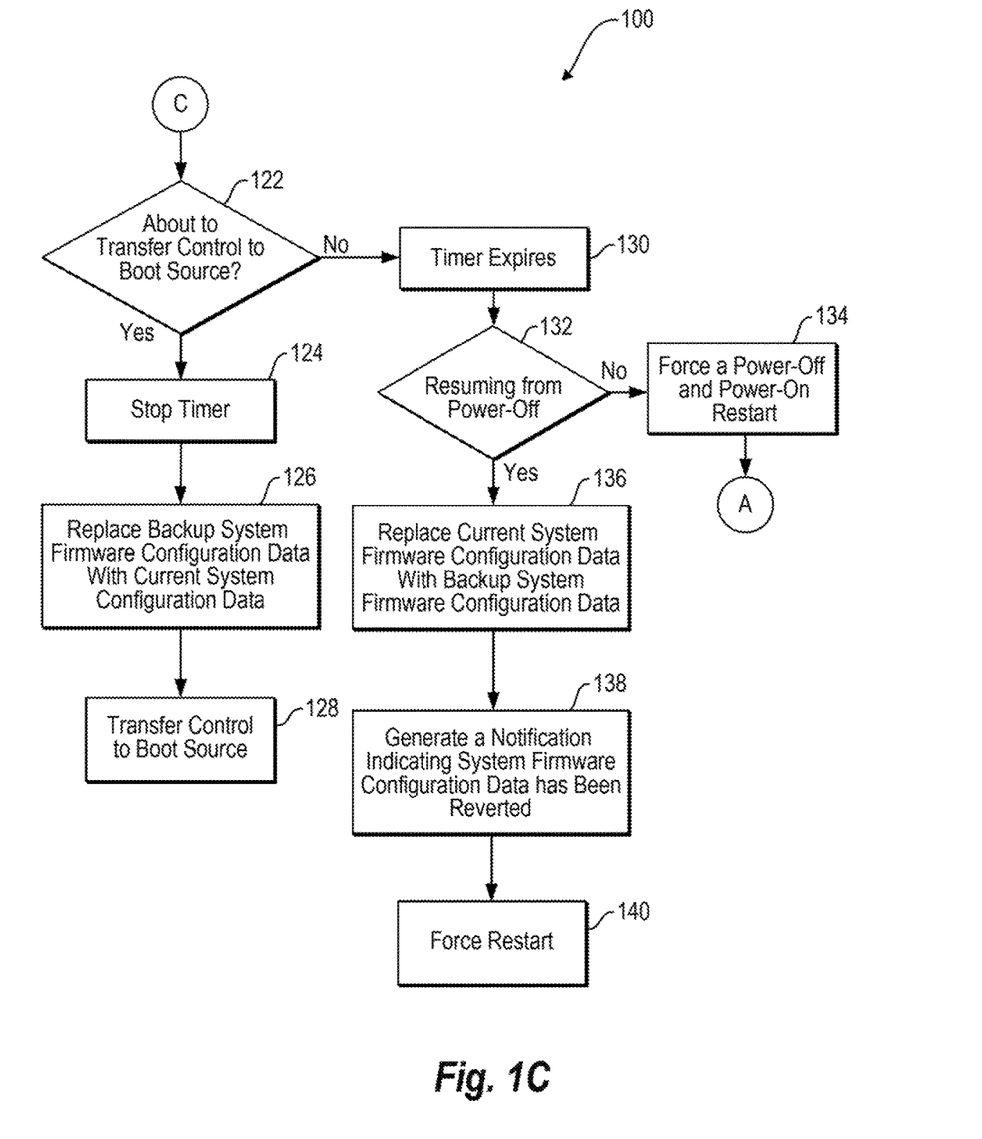
FIG. 1(c) depicts still further aspects of the example process flow diagram for automatically recovering from the POST hang failure in accordance with an aspect of the present disclosure.

Looking now at the figures, FIGS. 1(a)-1(c) depict an example process flow diagram 100 for automatically recovering from a POST hang failure in accordance with an aspect of the present disclosure. It should be readily apparent that the processes depicted in FIG. 1(a)-1(c) (as well as FIG. 3) represent generalized illustrations, and that other processes may be added or existing processes may be removed, modified, or rearranged without departing from the scope and spirit of the present disclosure. Further, it should be understood that the processes may represent executable instructions stored on a memory (e.g., a flash memory device) that may cause a computing system and/or processing device to respond, to perform actions, to change states, and/or to make decisions. Thus, the described processes may be implemented as executable instructions and/or operations provided by a memory associated with a computing system. Alternatively or in addition, the processes may represent functions and/or actions performed by functionally equivalent circuits like an application specific integrated circuit (ASIC) or other logic device associated with the computing system. Furthermore. FIG. 1(a)-1(c) (as well as FIG. 3) are not intended to limit the implementation of the described processes, but rather the figures illustrate functional information one skilled in the art could use to design/fabricate circuits, generate machine-readable instructions (e.g., software, firmware, etc.), or use a combination of hardware and software to perform the illustrated processes.

The process 100 begins at block 102, where the computing system determines whether backup system firmware configuration data exists. In some examples, this process may comprise the computing system's BIOS/UEFI determining whether backup system firmware configuration data exists. In addition, in some examples, this process may occur after the BIOS/UEFI determines that it is able to create and update non-volatile variables. Stated differently, this process may occur after the BIOS/UEFI determines that non-volatile write services are available. Such actions may be part of the computing system's POST process.

At block 104, in response to determining that backup system firmware configuration data does not exist, the computing system saves the current system firmware configuration data as the backup system firmware configuration data. In an example, this process comprises the computing system's BIOS/UEFI saving a backup copy of the current system firmware configuration data in nonvolatile memory. Then, at block at 110, the computing system continues the POST process.

By contrast, at block 106, and in response to determining that backup system firmware configuration data does exist, the computing system determines whether changes have been made to the system firmware configuration data since the last successful boot. This may be accomplished, for example, by the computing system comparing the current system firmware configuration data to the backup system firmware configuration data. If the computing system determines that changes have not been made to the system firmware configuration data (i.e., the current system firmware configuration data matches the backup system firmware configuration data), the computing system continues the POST process at block 110. On the other hand, if the computing system determines that changes have been made to the system firmware configuration data (i.e., the current system firmware configuration data does not match the backup system firmware configuration data), the computing system starts a timer at block 108 before continuing with the POST process in block 110. This timer may be, for example, a watchdog timer (WDT).

Continuing with the process 100 and no referring to FIG. 1(*b*), the computing system determines if a pre-boot user interface (UI) is about to be launched at block 112. The pre-boot UI may comprise, for example, a startup menu UI, computer setup UI, boot menu UI, option ROM UI, and/or a system firmware physical presence prompt UI. If a pre-boot UI is not about to be launched, the computing system continues with the POST process at block 120. By contrast, if a determination is made that a pre-boot UI is about to be launched, the timer is suspended at block 114 and the pre-boot UI is launched at block 116. Stated differently, before the computing system's BIOS/UEFI launches any pre-boot interface, the timer is suspended. Thereafter, once the pre-boot UI process is complete, the timer is resumed at block 118 and the POST process continues at block 120.

Continuing with the process 100 and now referring to FIG. 1(*c*), the computing system determines whether it is about to transfer control to a boot source (e.g., a boot loader) at block 122. This may comprise, for example, the BIOS/UEFI determining whether it is about to execute code from any potential boot source. If the answer is yes, this generally means that the POST process was completed successfully with the current system firmware configuration data, and therefore the timer is stopped at block 124, and the backup system firmware configuration data is replaced with the current system firmware configuration data at block 126 because it did not trigger a POST hang. Thereafter, at block 128, operational control is transferred to the boot source (e.g., a boot loader).

By contrast, if the computing system is not about to transfer control to a boot source and the timer expired at block 130, this generally means that the POST process was not completed successfully with the current system firmware configuration data. This may have occurred, for example, because changes to the system firmware configuration data caused a POST hang. In this situation, the computing system proceeds to check if the timer expired on a warm or cold boot. More specifically, the computing system checks if it is resuming from a power-off state at block 132. If the computing system is not resuming from a power-off state, the computing system forces a power-off and power-on restart at block 134 (e.g., the BIOS/UEFI forces a cold restart), and the process resumes at block 102 once the system restarts.

On the other hand, if the computing system is resuming from a power-off state, this generally means there is a problem with the current system firmware configuration data, and therefore at block 136 the computing system automatically replaces the current system firmware configuration data with the backup system firmware configuration data. That is, the computing system restores the backup system firmware configuration data which presumably does not cause a POST hang. Subsequently, at block 138, the computing system queues a notification (e.g., a Windows management interface (WMI) event) indicating system firmware configuration data has been reverted. This notification may be displayed on the computing system and/or sent to a remote computing system (immediately or during the next restart). At block 140, the computing system forces a restart (i.e., warm restart).

The above-described process 100 provides an automatic recovery process to address POST hang failures. More specifically, the above-described process automatically recovers from POST hang failures without requiring the user to perform remedial actions or have explicit knowledge of the changes that caused the failure. As a result, the number of service events related to these types of issues may be reduced.

Figure 2:
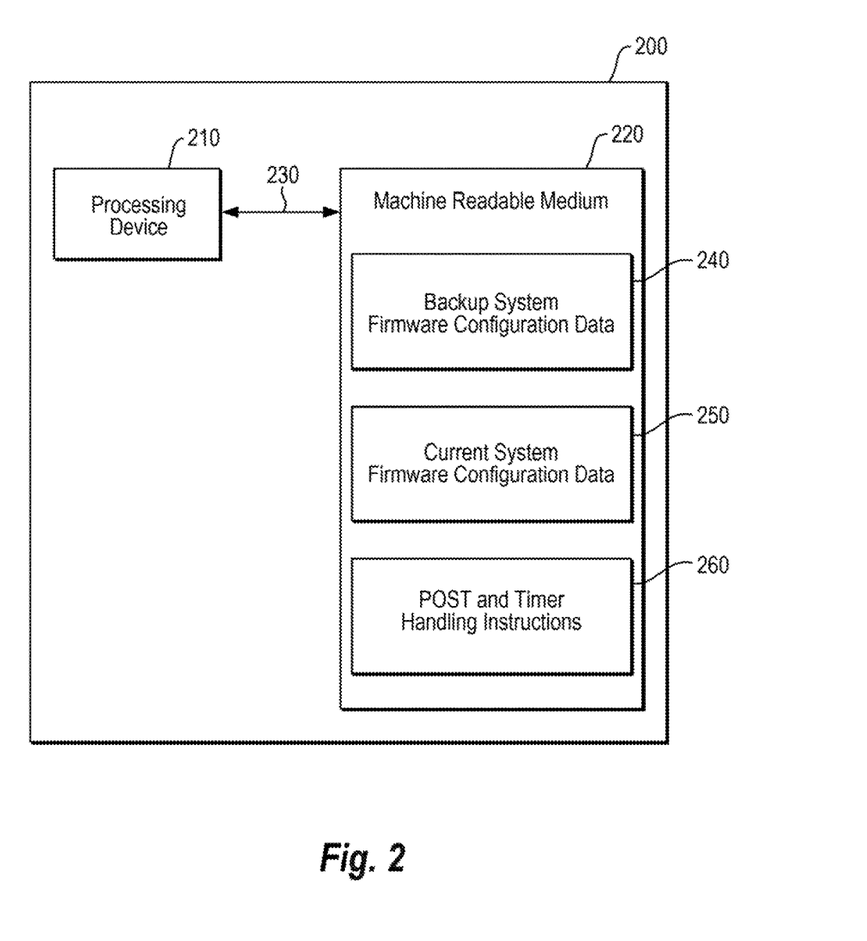
FIG. 2 depicts a computing system in accordance with an aspect of the present disclosure.

Turning now to FIG. 2, this figure depicts a computing system 200 in accordance with an aspect of the present disclosure. The computing system may be, for example, a desktop, workstation, laptop, scientific instrument, gaming device, tablet, AiO desktop, television, hybrid laptop, detachable tablet/laptop, server, retail point of sale, or similar computing system. The system 200 comprises a processing device 210, a non-transitory machine readable medium, and a communication bus 230. It should be readily apparent that the system 200 is a generalized illustration and that other elements may be added or existing elements may be removed, modified, or rearranged without departing from the scope of the present disclosure. For example, the system 200 may include other components common to computing systems such as, for example, a network interface, a user interface, fan, optical drive, power supply, motherboard, or the like.

The processing device 210 may be, for example, at least one of a central processing unit (CPU), a semiconductor-based microprocessor, a graphics processing unit (GPU), and/or another processing device arranged to retrieve and execute instructions stored on the machine-readable storage medium 220. Put another way, the processing device 210 may fetch, decode, and execute instructions stored an the machine-readable storage medium 220 to implement the functionalities described above and below.

The machine-readable storage medium 220 may correspond to any typical storage device that stores machine-readable instructions, such as programming code, software, firmware, or the like. For example, the non-transitory machine-readable medium 220 may include one or more of a non-volatile memory, a volatile memory, and/or a storage device. Examples of non-volatile memory include, but are not limited to electronically erasable programmable read only memory (EEPROM) and flash memory. Examples of volatile memory include, but are not limited to, static random access memory (SRAM) and dynamic random access memory (DRAM). Examples of storage devices include, but are not limited to, hard disk drives, compact disc read/write drives, digital versatile disc drives, optical read/write devices, and flash memory devices. In some embodiments, the instructions may be part of an installation package that can be executed by the processing device 210. In this case, the non-transitory machine-readable medium 220 may be a portable medium such as a CD-RW disc, DVD-RW disc, flash drive, or a memory maintained by a server from which the installation package can be downloaded and installed. In another embodiment, the instructions may be part of an application already installed.

Among other things, the machine-readable medium 220 may store backup system firmware configuration data 240, current system firmware configuration data 250, and POST and timer handling instructions 260. As mentioned, the backup system firmware configuration data 240 may be a saved version of system firmware configuration data that may be reverted to if the current firmware configuration data 250 causes a POST hang This may include backup system firmware configuration data 240 such as security configuration settings (e.g., cover lock control, cover sensor policy management, embedded security device control, secure boot, etc.), hardware configuration settings (e.g., SATA Emulation, USB port control, CPU turbo mode, SATA power management, PCI-e power management, etc.), and/or system configuration settings (e.g., Legacy Support, Fast Boot, USB 3.0 BIOS driver control, option ROM launch policies, AMT control, POST delay settings, etc.).

As mentioned above, the current system firmware configuration data 250 may be saved as the backup system firmware configuration data 240 if the current system firmware configuration data 250 does not cause a POST hang. The current system firmware configuration data 250 may include the same data as mentioned above with respect to the backup system firmware configuration data 250. Additionally, it should be understood that in some instances the backup system firmware configuration data 240 and the current system firmware configuration data 250 are the same, while in other instances the backup system firmware configuration data 240 and the current system firmware configuration data 250 are different. Furthermore, it should be understood that the machine-readable medium may be written to and read from in various examples. For instance, the system firmware configuration data may be read from the machine-readable medium as well as written to the machine-readable medium.

Turning to the POST and timer handling instructions 260, these instructions, when executed by the processing device 210, may cause the computing system to perform the above-described functionality to automatically recover from POST hang failures if necessary. For example, the POST and timer handling instructions 260 may comprise (i) instructions to initiate a POST process, (ii) instructions to determine that a change has been made to system firmware configuration data, (iii) instructions to start a timer, (iv) instructions to determine the timer has expired, and (v) instructions to at least one of (a) power-off and power-on the computing system, (b) replace current system firmware configuration data with backup system firmware configuration data, and (c) generate a notification indicating system firmware configuration data has been reverted.

In another example, the POST and timer handling instructions 260 may comprise (i) instructions to determine that a change has been made to system firmware configuration data and (ii) instructions to start a timer. The POST and timer handling instructions 260 may further comprise (iii) instructions to, if the timer has not expired prior to transferring operational control of the computing system to a boot source, (a) stop the timer prior to transferring operational control of the computing system to the boot source, (b) replace backup system firmware configuration data with current system firmware configuration data, and (c) transfer operational control of the computing to the boot source. By contrast, the POST and timer handling instructions 260 may additionally comprise (iii) instructions to, if the timer has expired prior to transferring operational control of the computing system to the boot source, conduct at least one of (a) power-off and power-on the computing system, (b) replace the current system firmware configuration data with the backup system firmware configuration data and (c) generate a notification indicating system firmware configuration data has been reverted.

Figure 3:
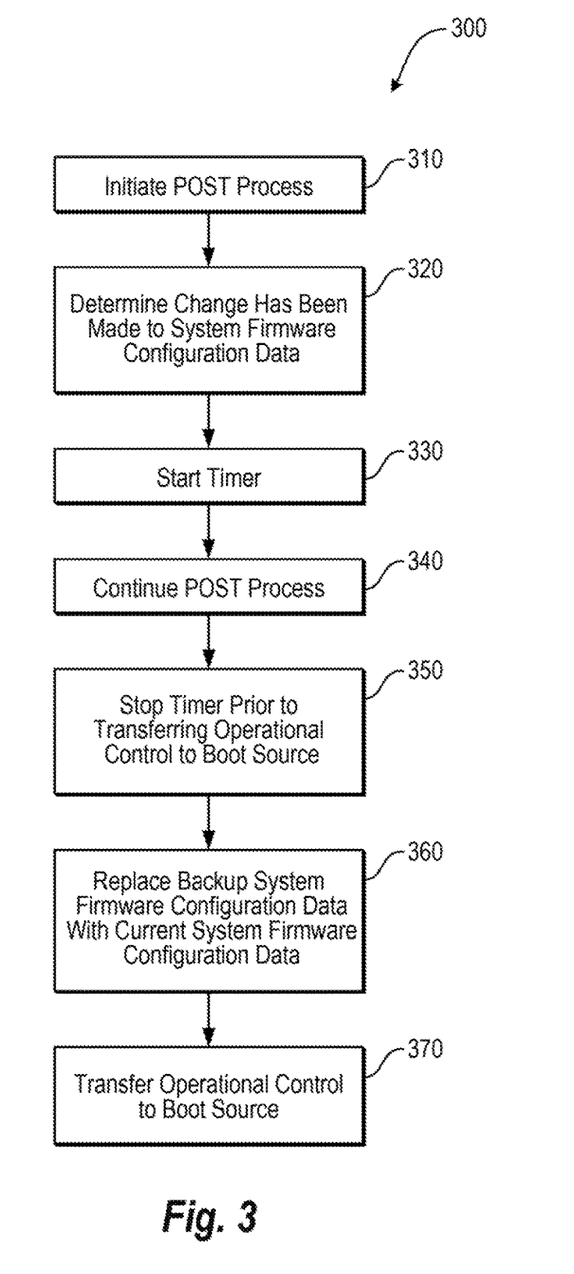
FIG. 3 depicts another example process flow diagram for automatically recovering from a POST hang failure in accordance with another aspect of the present disclosure.

Looking now at FIG. 3, this figure depicts an example process flow diagram 300 for automatically recovering from a POST hang failure in accordance with another aspect of the present disclosure. As mentioned, the process may be triggered in response to a processing device executing instructions stored on a machine-readable medium such as a flash memory device. Moreover, the instructions may be part of BIOS/UEFI instructions stored on the flash memory device which are executed when the computing system is initialized.

The process 300 may begin at block 310, where the computing system initiates a power on self-test (POST) process. At block 320, the computing system determines that a change has been made to system firmware configuration data. This may be accomplished, for example, by comparing current system firmware configuration data to backup system firmware configuration data. Thereafter, at block 330, the computing system starts a timer (e.g., a WDT). The computing system then continues the POST process at block 340. Prior to transferring operational control of the computing system to a boot source, the computing system stops the timer. Then, at block 360, the computing system replaces the backup system firmware configuration data with the current system firmware configuration data. Afterwards, at block 370, the computing system transfers operational control of the computing system to the boot source. Hence, because the computing system successfully completed the POST process with the current system firmware configuration data, this data is saved as the backup data just in case the computing system needs to revert back to these successful settings in response to further settings changes that trigger a POST hang.

While the above disclosure has been shown and described with reference to the foregoing examples, it should be understood that other forms, details, and implementations may be made without departing from the spirit and scope of the disclosure that is defined in the following claims. Furthermore, it should be understood that the present disclosure provides a novel and previously unforeseen approach to automatically reverse changes to the system firmware configuration data when such changes cause a POST hang. Among other things, this approach may reduce the number of service events related to these types of POST issues.

What is claimed is:

1. A computing system, comprising:
    a processing device; and
    a non-transitory machine-readable medium encoded with instructions executable by the processing device, wherein the non-transitory machine-readable medium comprises:
        instructions to initiate a power on self-test (POST) process,
        instructions to start a timer during the POST process in response to a determination that a change has been made to system firmware configuration data, wherein the timer is stopped in response to a successful completion of the POST process,
        instructions to, in response to a determination that a pre-boot user interface (UI) process is preparing to launch during the POST process, suspend the timer, wherein the pre-boot UI process comprises displaying at least two of a startup menu UI, computer setup UI, boot menu UI, option read-only memory (ROM) UI, and a system firmware physical presence prompt UI, instructions to, in response to a determination that the pre-boot UI process is completed during the POST process, resume the timer, instructions to, in response to a determination that the timer has expired before the computing system is ready to initiate a transfer of operational control to a boot source, perform at least one of:

power-off and power-on the computing system, replace current system firmware configuration data with backup system firmware configuration data, and generate a notification indicating system firmware configuration data has been reverted.

2. The computing system of claim 1, wherein the non-transitory machine-readable medium is a flash memory device.

3. The computing system of claim 1, wherein the notification is at least one of: displayed on the computing system and sent to a remote computing system.

4. The computing system of claim 1, wherein the machine-readable medium comprises instructions to compare the current system firmware configuration data with the backup system firmware configuration data.

5. The computing system of claim 1, wherein the system firmware configuration data comprises at least one of security configuration settings, hardware configuration settings, and system configuration settings.

6. A method for controlling a computing system, comprising:

initiating a power on self-test (POST) process;

determining whether a change has been made to system firmware configuration data by comparing current system firmware configuration data to backup system firmware configuration data;

starting a timer during the POST process in response to a determination that a change has been made to system firmware configuration data, the timer to be stopped in response to a successful completion of the POST process;

determining whether a pre-boot user interface (UI) process is preparing to launch or is completed during the POST process, wherein the pre-boot UI process comprises displaying at least two of a startup menu UI, computer setup UI, boot menu UI, option read-only memory (ROM) UI, and a system firmware physical presence prompt UI;

in response to a determination that the pre-boot UI process is preparing to launch during the POST process, suspending the timer;

in response to a determination that the pre-boot UI process is completed during the POST process, resuming the timer;

determining whether the computing system is ready to initiate a transfer of operational control to a boot source prior to an expiration of the timer;

in response to a determination that the computing system is ready to initiate the transfer of operational control to the boot source prior to the expiration of the timer:

replacing the backup system firmware configuration data with the current system firmware configuration data; and transferring operational control of the computing system to the boot source.

7. The method of claim 6, wherein the system firmware comprises a basic input/output system (BIOS) or a unified extensible firmware interface (UEFI).

8. The method of claim 6, wherein the system firmware configuration data comprises at least one of security configuration settings, hardware configuration settings, and system configuration settings.

9. The method of claim 6, wherein the boot source comprises a boot loader.

10. The method of claim 6, further comprising:

after suspending the timer, launching the pre-boot UI process.

11. A non-transitory machine-readable medium comprising instructions, which when executed, cause a computing system to:

initiate a power on self-test (POST) process;

start a timer during the POST process in response to a determination that a change has been made to system firmware configuration data, wherein the timer is stopped in response to a successful completion of the POST process;

in response to a determination that a pre-boot user interface (UI) process is preparing to launch during the POST process, suspend the timer, wherein the pre-boot UI process comprises displaying at least two of a startup menu UI, computer setup UI, boot menu UI, option read-only memory (ROM) UI, and a system firmware physical presence prompt UI;

in response to a determination that the pre-boot UI process is completed during the POST process, resume the timer;

in response to a determination that the computing system is ready to initiate a transfer of operational control of the computing system to a boot source prior to an expiration of the timer:

stop the timer, replace backup system firmware configuration data with current system firmware configuration data, and transfer the operational control of the computing system to the boot source; and in response to a determination that the timer has expired before the computing system is ready to initiate the transfer of operational control to the boot source, conduct at least one of the following:

power-off and power-on the computing system, replace the current system firmware configuration data with the backup system firmware configuration data, and generate a notification indicating system firmware configuration data has been reverted.

12. The non-transitory machine-readable medium of claim 11, wherein the system firmware comprises a basic input/output system (BIOS) or a unified extensible firmware interface (UEFI).

13. The non-transitory machine-readable medium of claim 11, wherein the instructions, when executed, cause the computing system to determine that a change has been made to system firmware configuration data by comparing the current system firmware configuration data to the backup system firmware configuration data.

14. The non-transitory machine-readable medium of claim 11, wherein the system firmware configuration data comprises at least one of security configuration settings, hardware configuration settings, and system configuration settings.

15. The non-transitory machine-readable medium of claim 11, wherein the non-transitory machine-readable medium comprises a flash memory device.

16. The non-transitory machine-readable medium of claim 11, wherein the notification is at least one of:
   a notification displayed on the computing system, and
   a notification sent to a remote computing system.

17. The computing system of claim 1, wherein the machine-readable medium comprises:
   instructions to, in response to a determination that computing system is ready to initiate the transfer of operational control to the boot source prior to the expiration of the timer:
      replace the backup system firmware configuration data with the current system firmware configuration data; and
      transfer operational control of the computing system to the boot source.

18. The method of claim 6, further comprising:
   in response to a determination that that the timer has expired before the computing system is ready to initiate the transfer of operational control to the boot source, perform at least one of:
      power-off and power-on the computing system,
      replace current system firmware configuration data with backup system firmware configuration data, and
      generate a notification indicating system firmware configuration data has been reverted.

19. The method of claim 18, wherein the notification is at least one of:
   a notification displayed on the computing system, and
   a notification sent to a remote computing system.

* * * * *

UNITED STATES PATENT AND TRADEMARK OFFICE
CERTIFICATE OF CORRECTION

PATENT NO. : 10,289,399 B2
APPLICATION NO. : 15/110915
DATED : May 14, 2019
INVENTOR(S) : Christopher H Ham et al.

It is certified that error appears in the above-identified patent and that said Letters Patent is hereby corrected as shown below:

In the Claims

In Column 11, Line 20, Claim 18, after "determination" delete "that".

Signed and Sealed this
Thirteenth Day of August, 2019

Andrei Iancu
*Director of the United States Patent and Trademark Office*